Aug. 31, 1926.
J. S. MILNE
1,598,357
CINEMATOGRAPH
Filed May 12, 1922  3 Sheets-Sheet 2
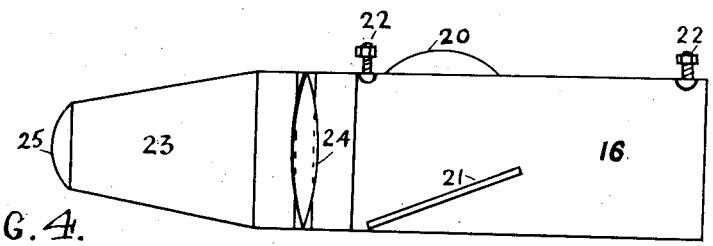
FIG. 4.
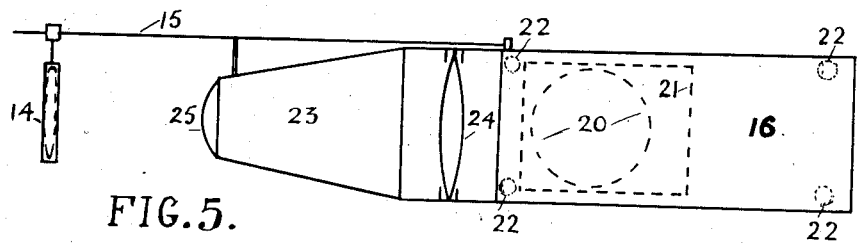
FIG. 5.
FIG. 7.
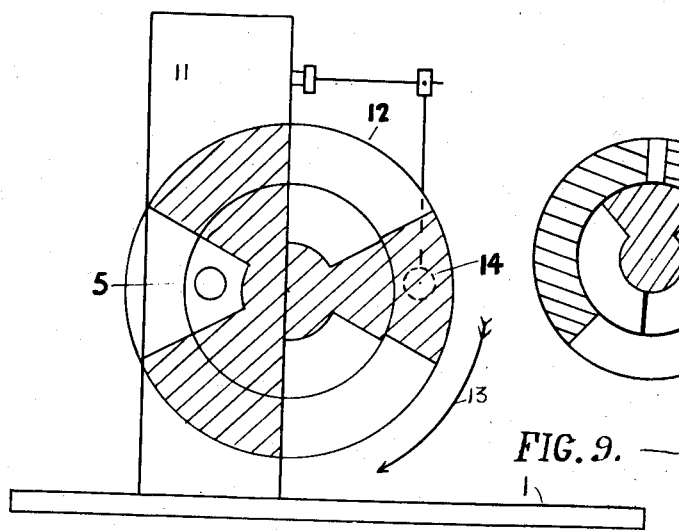
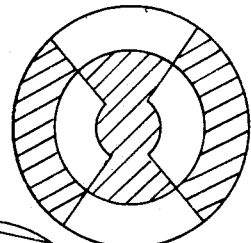

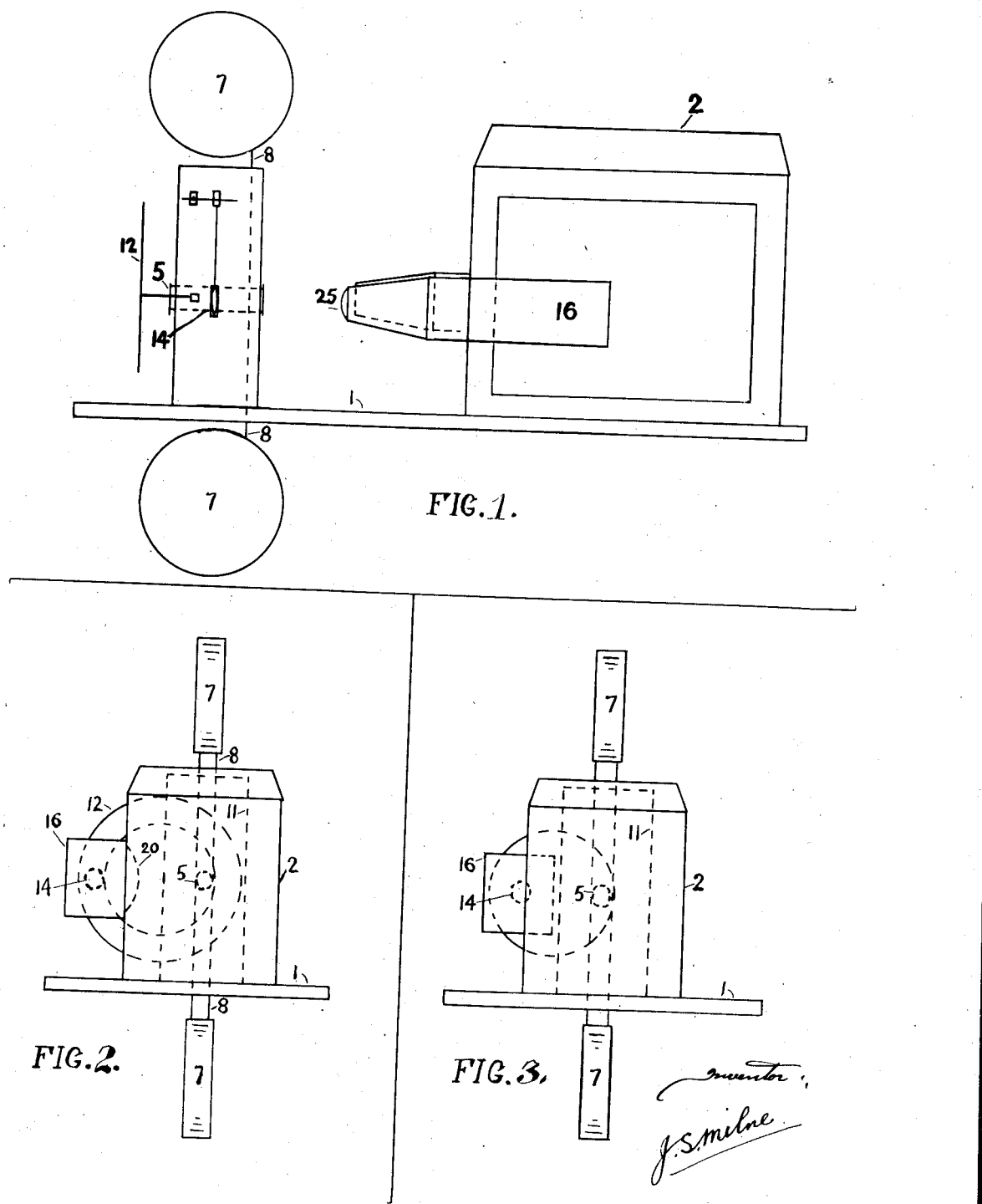

FIG. 6.
Inventor
J. S. Milne

Aug. 31, 1926.

J. S. MILNE 1,598,357

CINEMATOGRAPH

Filed May 12, 1922    3 Sheets-Sheet 3

Patented Aug. 31, 1926.

1,598,357

UNITED STATES PATENT OFFICE.

JOSEPH SNOWBALL MILNE, OF WHICKHAM, SWALWELL, ENGLAND.

CINEMATOGRAPH.

Application filed May 12, 1922, Serial No. 560,383, and in Great Britain December 30, 1921.

This invention relates to the projection of cinematograph pictures.

The object of the invention is to provide means whereby a complete absence of "flicker" and "colour flicker" is obtained.

As an example of the means I employ to attain the object of my invention, I attach to an ordinary cinematograph projector an auxiliary projecting device or lantern, which may be illuminated by the same and any kind of light used in the ordinary projector, or by separated illuminating means as desired, and in conjunction therewith I employ a rotary shutter of any form adapted alternately to modify the light from each projector, for which purpose the rotary shutter of the projector may be made partly transparent or fully transparent of plain or perforated material, and partly translucent. For example, the masking portion may be made of thin, clear, glass or other fully transparent material having a rippled surface which allows the maximum of light through on to the screen. It is the particular effect of an uneven surface of the transparent material of the masking portion which when passing before the light, while it does not stop the light, distracts and distorts (not "dims or diffuses") the beam of projector light so that no cross movement of the film is seen on the screen. The transparency of this masking portion allows the original and ever changing colour of the film to pass automatically onto the screen at the "change" period and prevents both a shadow which causes the "flicker," and a colour contrast which causes the "colour flicker."

Such a shutter as above set forth may be substituted for the ordinary shutter on a projector without the use of an auxiliary light, and the resulting effect will be almost as good as with the auxiliary light, but where possible it is preferred to use an auxiliary light as this latter compensates for any loss of light due to absorption and diffusion by the rippled surface of the shutter blade.

The invention will now be described by way of example with reference to the accompanying drawing, in which—

Fig. 1 is a side elevation of an ordinary projecting lantern fitted with an auxiliary lighting device according to my invention, Fig. 2 is a rear elevation of Fig. 1, Fig. 3 is a rear elevation of a slightly modified construction, Fig. 4 is a plan view of the auxiliary lighting device.

Fig. 5 is a side elevation of Fig. 4,

Fig. 6 is a front elevation showing one form of revolving shutter,

Figs. 7, 8 and 9 show modified forms of revolving shutter,

Figure 8:
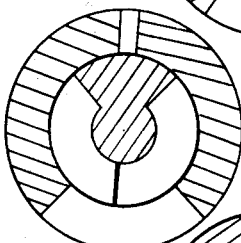

Referring more particularly to the drawings, the numeral 1 indicates the base of the apparatus, 2 an ordinary cinematograph projector to which I attach in any convenient manner an auxiliary lantern 16. This auxiliary lantern 16 may be illuminated by means of the ordinary illuminant of the projector 2, suitable condensing lens 20 and a mirror 21 being provided for this purpose, as indicated in Figs. 4 and 5, in the auxiliary lantern 16, or a separate illuminant may be provided if desired.

Figure 9:
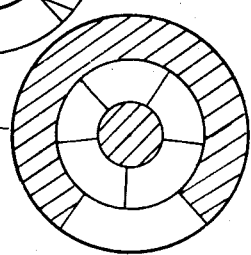
Figure 10:
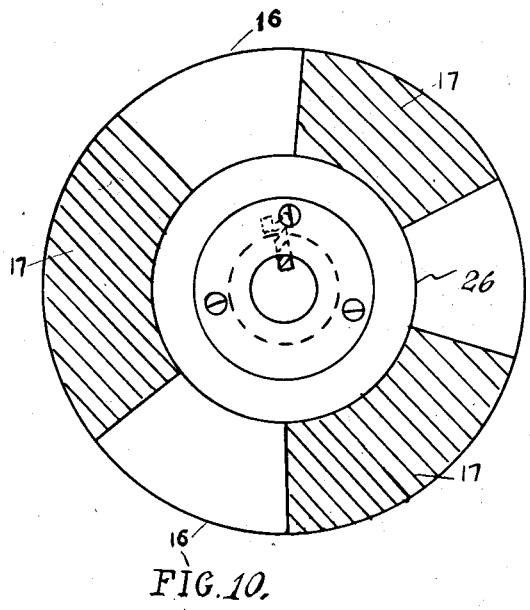
Fig. 10 is a front view of a rotating mirror form of shutter.
Figure 11:
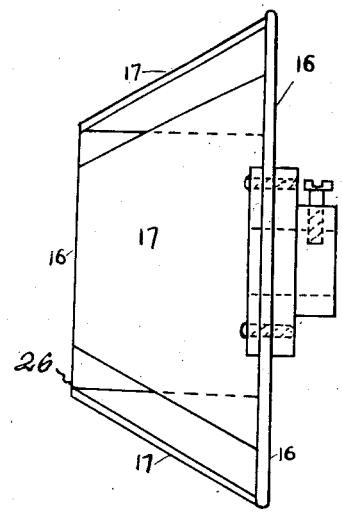
Fig. 11 is a side elevation of Fig. 10.
Figure 12:
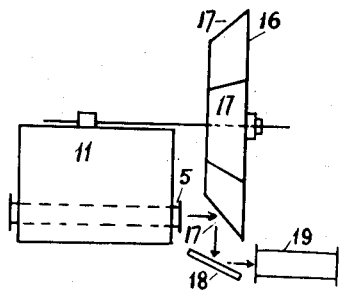
Fig. 12 is a plan view showing the adaptation of the rotating mirror form of shutter to a projecting lantern.
Figure 13:
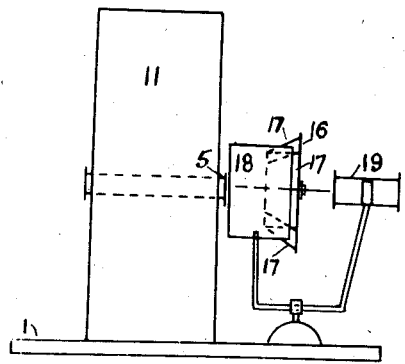
Fig. 13 is an elevation of Fig. 12.

In conjunction with the said cinematograph 2 and auxiliary lantern 16 I provide a rotary shutter 12 constructed as indicated in Figs. 6, 7 or 9, for the purpose of alternately reducing the light from each lantern, and those parts of the shutter indicated by shade lines are made translucent as explained above, so that the light at the "change" period will never be completely shut off. In the case of the shutter shown in Fig. 8, a masking portion is provided for the auxiliary light only, it being found unnecessary to use a masking portion for the main light where there is a long throw.

The film driving mechanism which is of the usual construction is indicated at 11, the film at 8 and the film boxes at 7, while the film projecting lens is indicated at 5.

The auxiliary lantern 16 may be attached to the cinematograph projector 2 by means of the bolts and nuts 22, or in any other convenient manner, or may be separate therefrom, and is provided with a condenser 24, projecting lens 25 and erecting lens 14, which latter may be adjustably mounted on the auxiliary lantern 16 by means of the rod 15 (Fig. 5) or on the casing of the film driving mechanism 11 (Figs. 1 and 6).

As shown in Fig. 6, the translucent portions of the rotating shutter 12 will alternately cover the lens 5 of the cinematograph projector 2 and the lens 25 of the auxiliary lantern 16. By the insertion of the erecting lens 14 between the auxiliary lantern 16 and the rotating shutter 12, the "rain" effect above referred to, caused by the intermittent eclipsing of the scratches on the film, will be minimized for the reason that by arrangement of the point of focus of lens 14, the edge of the shadow cast by the translucent part of the shutter moving in one direction and the edge of the transparent part of the shutter moving in the other direction will apparently enter the field of view upon the screen from the same side as the picture of the film and be moving in the same direction.

By a variable arrangement of colour slides in conjunction with the auxiliary lantern, harmony of colour and regulation of light intensity is further obtainable on the screen, according to the variable colour and density of the picture on the film.

By arranging the auxiliary lantern closer to the cinematograph lantern as shown at Fig. 3, a shutter of the shape ordinarily used may be employed for alternately modifying the light from the lanterns.

Referring to Figs. 10 to 13, instead of forming the rotating shutter 16 with flat translucent portions as above described, I mount thereon, about a central tube 26 one or more reflecting surfaces 17 at an angle of about 45°. These mirrors 17 cooperate with a fixed mirror 18 also set at an angle of about 45° to cause a reflected beam of light to pass through a projecting device 19. Such a shutter will alternately permit the direct passage of the projection beam to the screen, and a reflected passage thereof through the projecting device 19. Obviously the mirrors or the projecting device must be made translucent in order to prevent the picture in the film being reflected during the "change" period, but at the same time permit the requisite and regulated passage of light according to the varying density of the film being exhibited.

With the apparatus as described above it is possible to project upon the screen in the interval between each picture of the film, a patch of light which is so regulated in intensity and colour according to the varying degree of density and colour of the picture being projected, that the result will be a complete absence of "flicker" which is so distressing to the spectator. Owing to the transparency of the shutter a substantial saving in light is effected, which means that less current is required, so that the cost of running the projector is considerably reduced. As a further consequence less heat is generated, so that the risk of firing the film is reduced. Again, better perspective is given to the picture, as semitones are not darkened by opacity; and for the same reason the rain effect is minimized.

I claim:—

1. In means for projecting cinematograph pictures, means for producing a projection light, means for producing an auxiliary light, an erecting lens positioned to intercept the beam of the auxiliary light, a rotating shutter to intercept the auxiliary light, the said shutter having a masking portion of any transparent irregularly rippled material adapted to intercept the beam of the projection light.

2. In means for projecting cinematograph pictures, a lamp house and projecting lens, a casing adapted to be attached to the side of said lamp house, the side of the casing adjacent the lamp house having an opening to allow of the passage of light from a corresponding opening in the lamp house, a reflector in said casing, a condenser and auxiliary projecting lens cooperating with said reflector, a shutter spindle, a rotating shutter adapted to be mounted on said shutter spindle, said shutter having a masking portion of any transparent irregularly rippled material adapted to pass alternately before the projecting lenses, and an erecting lens positioned to intercept the beam of light from the auxiliary projecting lens.

3. In means for projecting cinematograph pictures, a lamp house and projecting lens, a casing adapted to be attached to the side of said lamp house, the side of the casing adjacent the lamp house having an opening to allow of the passage of light from a corresponding opening in the lamp house, a condenser in said opening, a reflector in said casing, a condenser and auxiliary projecting lens cooperating with said reflector, a shutter spindle, a rotating shutter adapted to be mounted on said shutter spindle, said shutter having a masking portion of any transparent irregularly rippled material adapted to pass alternately before the projecting lenses, and an erecting lens positioned to intercept the beam of light from the auxiliary projecting lens.

4. In means for projecting cinematograph pictures, a lamp house and projecting lens, a casing adapted to be attached to the side of said lamp house, the side of the casing adjacent the lamp house having an opening to allow of the passage of light from a corresponding opening in the lamp house, a reflector in said casing, a condenser and auxiliary projecting lens cooperating with said reflector, means for interposing a coloured slide in the beam of light from said reflector, a shutter spindle, a rotating shutter adapted to be mounted on said shutter spindle, said shutter having a masking portion of transparent irregularly rippled material adapted to pass alternately before the projecting lenses, and an erecting lens positioned to intercept the beam of light from the auxiliary projecting lens.

5. Apparatus for the projection of cinematograph pictures comprising a projecting lantern, means for projecting an auxiliary light on to the screen, an erecting lens positioned to intercept the beam of the auxiliary light, a shutter spindle, a rotating shutter adapted to be mounted on said shutter spindle, said shutter having a masking portion of any transparent irregularly rippled material adapted to pass alternately before the projecting lenses.

JOSEPH SNOWBALL MILNE.